United States Patent [19]
Ellis

[11] Patent Number: 4,965,989
[45] Date of Patent: Oct. 30, 1990

[54] IN-LINE MOLECULAR SIEVE BED CONVERSION KIT

[76] Inventor: Lamar Ellis, 320 W. Walnut Ave., Ontario, Calif. 91762

[21] Appl. No.: 335,703

[22] Filed: Apr. 10, 1989

[51] Int. Cl.⁵ ............................................. B01D 53/04
[52] U.S. Cl. ........................................ 55/162; 55/316; 55/356; 55/389
[58] Field of Search ....................... 55/16, 68, 75, 158, 55/161–163, 179, 389, 316, 356

[56] References Cited

U.S. PATENT DOCUMENTS

| | | | |
|---|---|---|---|
| 3,490,205 | 1/1970 | Hauser | 55/179 |
| 3,614,856 | 10/1971 | Sanz et al. | 55/158 X |
| 3,668,837 | 6/1972 | Gross | 55/158 |
| 3,880,616 | 4/1975 | Myers et al. | 55/162 X |
| 3,976,451 | 8/1976 | Blackmer et al. | 55/158 |
| 3,979,190 | 9/1976 | Hedman | 55/158 |
| 4,174,955 | 11/1979 | Blackmer et al. | 55/158 |
| 4,373,938 | 2/1983 | McCombs | 55/389 X |
| 4,449,990 | 5/1984 | Tedford, Jr. | 55/179 X |
| 4,491,459 | 1/1985 | Pinkerton | 55/163 |
| 4,502,873 | 3/1985 | Mottram et al. | 55/179 |
| 4,561,865 | 12/1985 | McCombs et al. | 55/162 X |
| 4,632,677 | 12/1986 | Blackmer | 55/158 |
| 4,673,420 | 6/1987 | Haker et al. | 55/179 |
| 4,681,099 | 7/1987 | Sato et al. | 55/179 X |
| 4,681,602 | 7/1987 | Glenn et al. | 55/158 X |
| 4,759,780 | 7/1988 | Yamada et al. | 55/158 |

FOREIGN PATENT DOCUMENTS 964153 3/1975 Canada ................................. 55/179

Primary Examiner—Robert Spitzer

[57] ABSTRACT

This invention relates to a method and apparatus for providing an in-line molecular sieve conversion kit for generating oxygen from the atmosphere which includes an elongated tube filled with separating material, pressurized air from the atmosphere introduced into the tube and conduits exiting from the tube carrying the oxygen to the point of use. An auxiliary spirally wound reservoir tube for storing pressurized atmospheric air to aid in the removal of nitrogen from the separating tube through a solenoid operated valve.

1 Claim, 3 Drawing Sheets

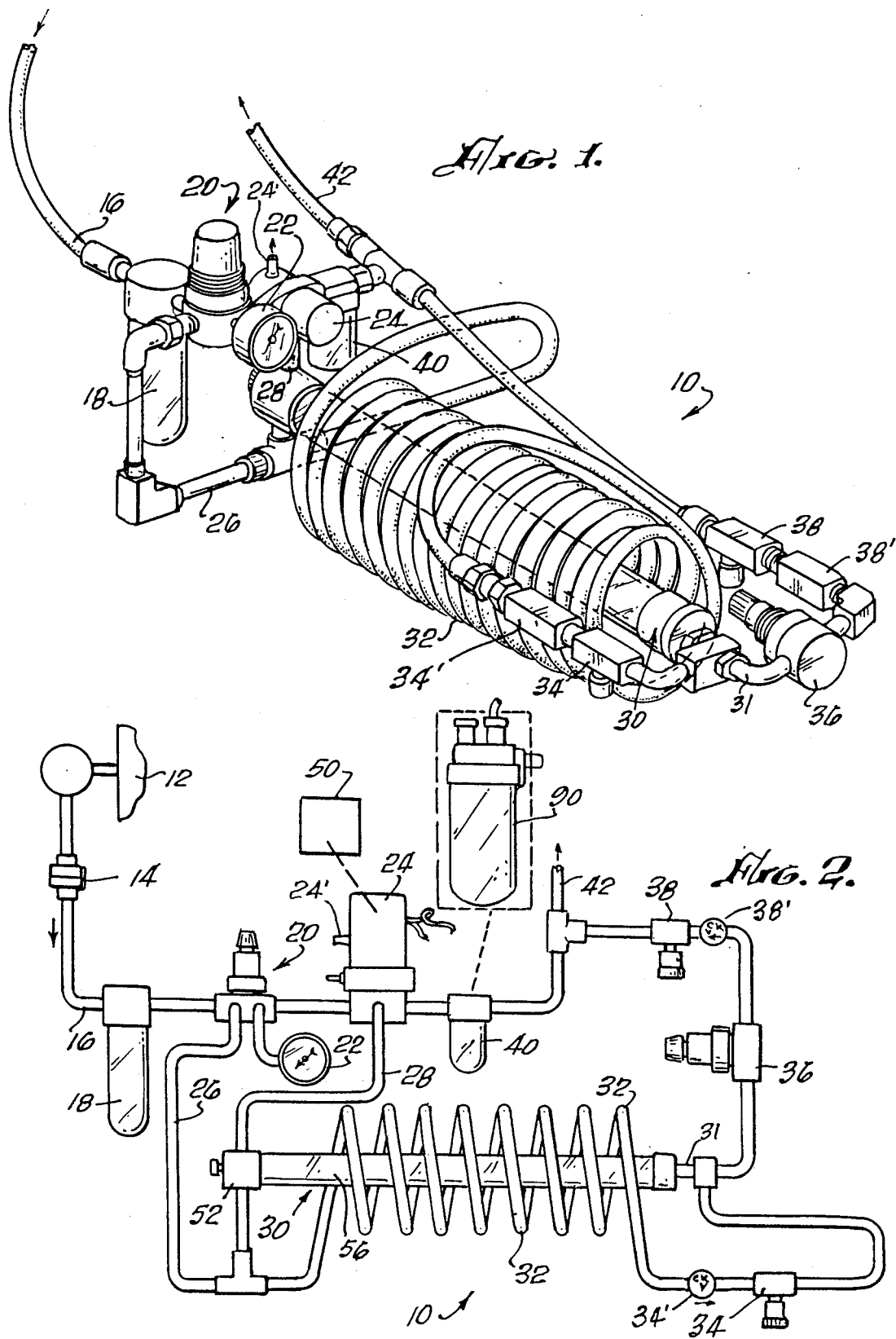

FIG. 4. TIME/PRESSURE SCHEDULE MOLECULAR SIEVE BED

| Pressure Into Bed | #1 Pressure Up | #2 Expel Pressure | #3 Produce Oxygen | #4 Wash | #5 Expel Pressure | #6 Produce Oxygen |
|---|---|---|---|---|---|---|
| Time in Seconds | 30 sec | 30 sec | 30 sec | 30 sec | 30 sec | 30 sec |

COMPRESSOR COMPARISONS
EFFICIENCY RATIO CHART ically operated solenoid valve 24 to various conduits as selected by a timer and control unilt schematically shown in FIG. 2.
IN-LINE MOLECULAR SIEVE BED CONVERSION KIT

BACKGROUND OF THE INVENTION

1. FIELD OF THE INVENTION

The field of this invention is primarily in the placement of a portable oxygen separating sieve bed in a simplified kit form at the point of use of the oxygen, while utilizing a pressurizing source of atmospheric air of a conventional unit.

2. DESCRIPTION OF THE PRIOR ART

In previous years, it has been cumbersome and expensive to bring Molecular Sieve Beds into the proximity of the patient or ultimate user of the separated oxygen.

Devices such as the Monaghan M515 IPPB machine and other life supporting ventilator systems have had to have received their oxygen from wall outlets or oxygen tanks. This source of oxygen was not always readily available in remote places where such equipment is usable. Such equipment was always difficult to use in autos, buses, trucks or planes.

Uses other human patient needs are always not readily available because of the absence of such tanks or wall outlets.

Thus, the use oxygen using equipment has always been an expensive and cumbersome problem in the field of medicine and industry.

BACKGROUND OF THE INVENTION

In summary, this invention is a direct approach to the problems stated in the background comments.

The Applicant has studied the problem and has suceeded in eliminating the problem in many areas of the medical and industrial segments of our society.

Applicant has devised an apparatus in the form of a kit that can be adapted to existing art in such a manner that the supply of oxygen is now capable of being brought to the site in a simplified and inexpensive manner.

It is therefore an object of this invention to utilize existing compressed air sources to furnish the air under pressure in order to result in a supply of oxygen.

A further object of this invention is to simplify existing molecular sieve beds to a fraction of the elements and cost of such beds.

Anotherr object of this invention is to utilize several types of material, depending on the particular need, in the sieve bed portion of his apparatus.

Yet other objects and advantages of this invention will become more apparent to those skilled in the art after considering the following detailed specification together with the accompanying drawings.

BRIEF DESCRIPTION OF THE DRAWINGS

FIG. 1 is a perspective view of the IN-LINE MOLECULAR SIEVE BED CONVERSION KIT of the invention;

FIG. 2 is a simplified schematic view of the various components of the invention of FIG. 1;

FIG. 4 is a timing chart of the time intervals through a typical cycle of the sieve bed.

DESCRIPTION OF A PREFERRED EMBODIMENT

Figure 3:
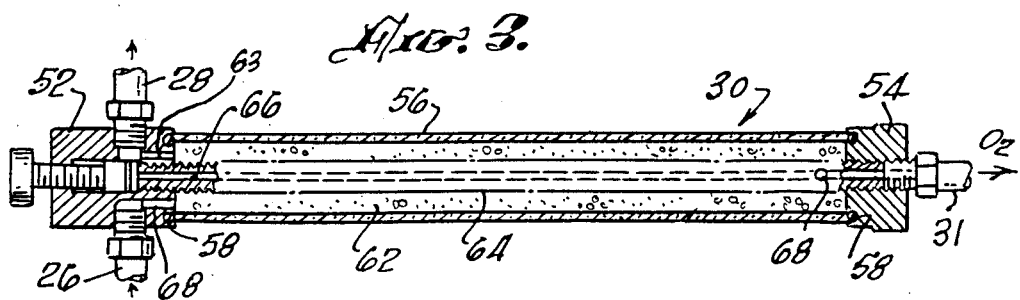
FIG. 3 is a sectional view through the sieve bed of FIGS. 1 and 2.

Referring to the drawings, and particularly to FIGS. 1 and 2, there is shown an assembled kit of the invention. The reference numeral 10 generally designates the overall system and its components.

A source of compressed air 12, such as can be supplied from many sources and equipment is generally provided with a coupling means 14.

The kit assembly is provided with a coupling joining means from a line 16. This line brings the compressed air through a filter 18 into a pressure regulator 20. The pressure can be indicated on a visible gauge 22.

Regulated air then is directed through an electrically operated solenoid valve 24 to various conduits as selected by a timer and control unilt schematically shown in FIG. 2.

Compressed air leaving regulator valve 20 is introduced into sieve bed tube through line 26. The atmospheric air then passes through sieve bed material 62 toward the downstream end of tube 30. A flexible conduit, which is formed in the form of a spirally wound coil 32 is connected into line 26 and is provided with a check valve 34', regulator valve 34, and then joins conduit 31 at the downstream end of the tube 30. When the solenoid valve 24 is actuated to allow pressure of atmospheric air to enter the sieve bed and the spiral reservoir, separated oxygen is forced through pressure regulator 36, check valve 38' and regulator 38 into line 42 and to the point of use for such oxygen. The solenoid valve 24 then is actuated by the timer control 50 to allow the stored-up pressure atmospheric air in reservoir 32 to push out the separated nitrogen through exit conduit 28 and to atmosphere through port 24' in the solenoid valve. This cycle is indicated in the graph 70 of FIG. 4. The solenoid valve also allows pressurized oxygen to pass through neubulizer 40 to be added to the exit line 42. An alternate form of neubulizer is shown in FIG. 2 at 90, just to show that a selected type can be inserted at that point, if desired.

This arrangemetn uses atmospheric air that is under pressure and comes from the reservoir within the spirally wound tube 32, rather than using oxygen to cleanse the system of nitrogen, as was done in prior art. This puts more usable oxygen to the point of use.

Referring now to FIG. 3, it can be seen that the upstream end of the sieve tube is designated by the reference numeral 52. The exit end of the tube is shown at 54, while the tube 56, most probably made of glass, is held in compression between said ends against seal rings 58. The ends of the tube are held together by means of a threaded rod 64. Threaded rod has a port 66 formed therethrough. Port 68 brings the pressurized air into the bed of material 62. A port 63 is provided to be used to wash the nitrogen that had been separated from the air out of the tube. The sequence of this timing is shown in the chart of FIG. 4.

At the downstream end of the hollow rod 64 are ports 68 which allow the oxygen to be exited into line 31.

Figure 5:
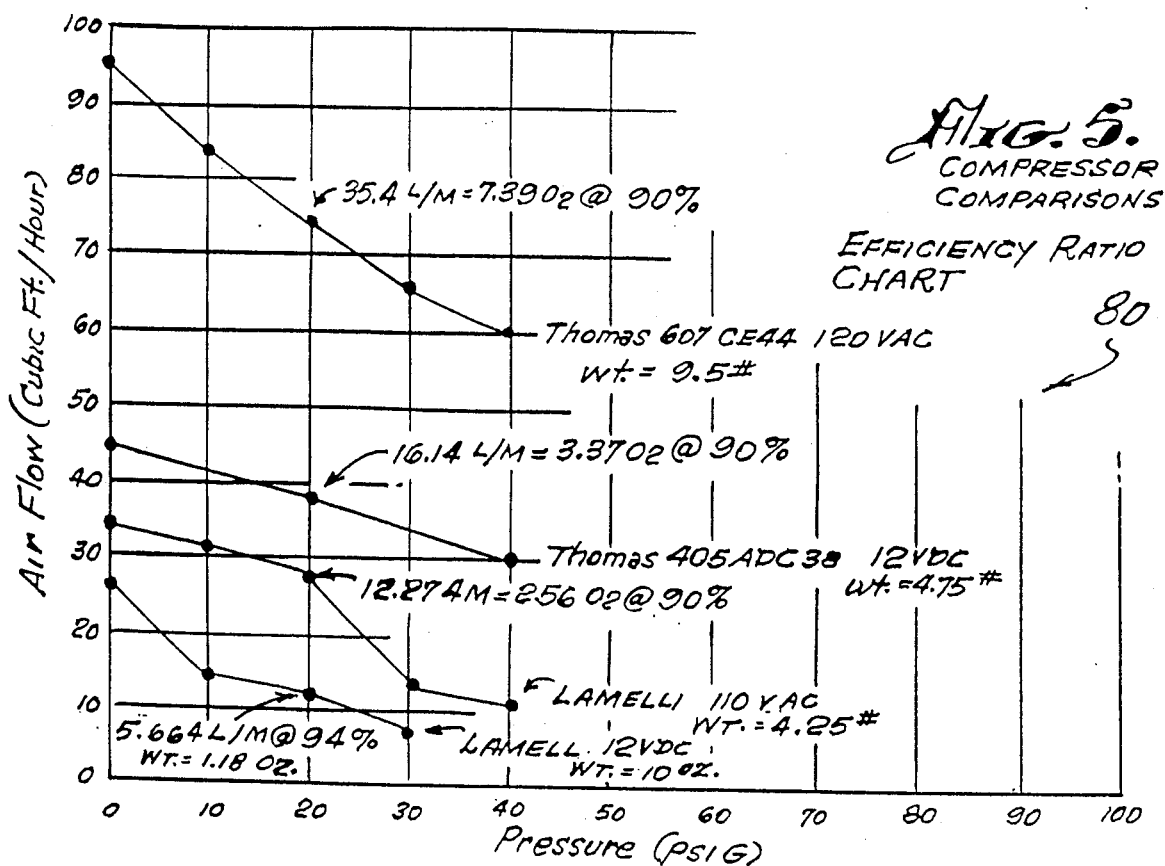
FIG. 5 is a comparative chart.

FIG. 5 is a chart indicating parameters of compressor flow and pressure that can be utilized by the applicants until (indicated as the LAMELLI unit).

It is to be understood that the embodiments shown are by no means attemping to limit the variations possible without leaving the scope of the invention.

I claim:

1. A kit for providing any in-line molecular sieve apparatus for separating oxygen from pressurized atmospheric air which comprises:

a sieve bed containing material for separating oxygen from the atmosphere; compressor means for pressurizing atmospheric air; a first conduit means for carrying said pressurized atmospheric air; to said sieve bed; filter means located in said conduit for filtering said pressurized atmospheric air; pressure regulating means between said filter means and said sieve bed; a second conduit means in the form of a spirally wound tube connected to said first conduit means; first check valve and flow regulator means inserted into said second conduit means; upstream and downstream closure caps provided on said sieve bed; upstream closure cap having a first port for introducing pressurized atmospheric air from said first conduit means into the seive bed material; an elongated hollow tubular rod interconnecting said upstream and downstream closure caps; second ports connecting the downstream side of said sieve bed to the hollow portion of said connecting rod; a third port connecting said upstream hollow portion of said elongated hollow tubular rod to a third conduit means located between a solenoid valve and upstream closure cap; a fourth conduit means for carrying oxygen from said second conduit means at the downstream end of said sieve bed through a second pressure regulator means; and through second check valve and flow regulator means; a fifth conduit means connecting said solenoid valve with said fourth conduit means; a neubulizer inserted into said fifth conduit means between said solenoid valve and said fourth conduit means; and a timer for actuating said solenoid valve at selected intervals.

* * * * *